Figures 1, 2:
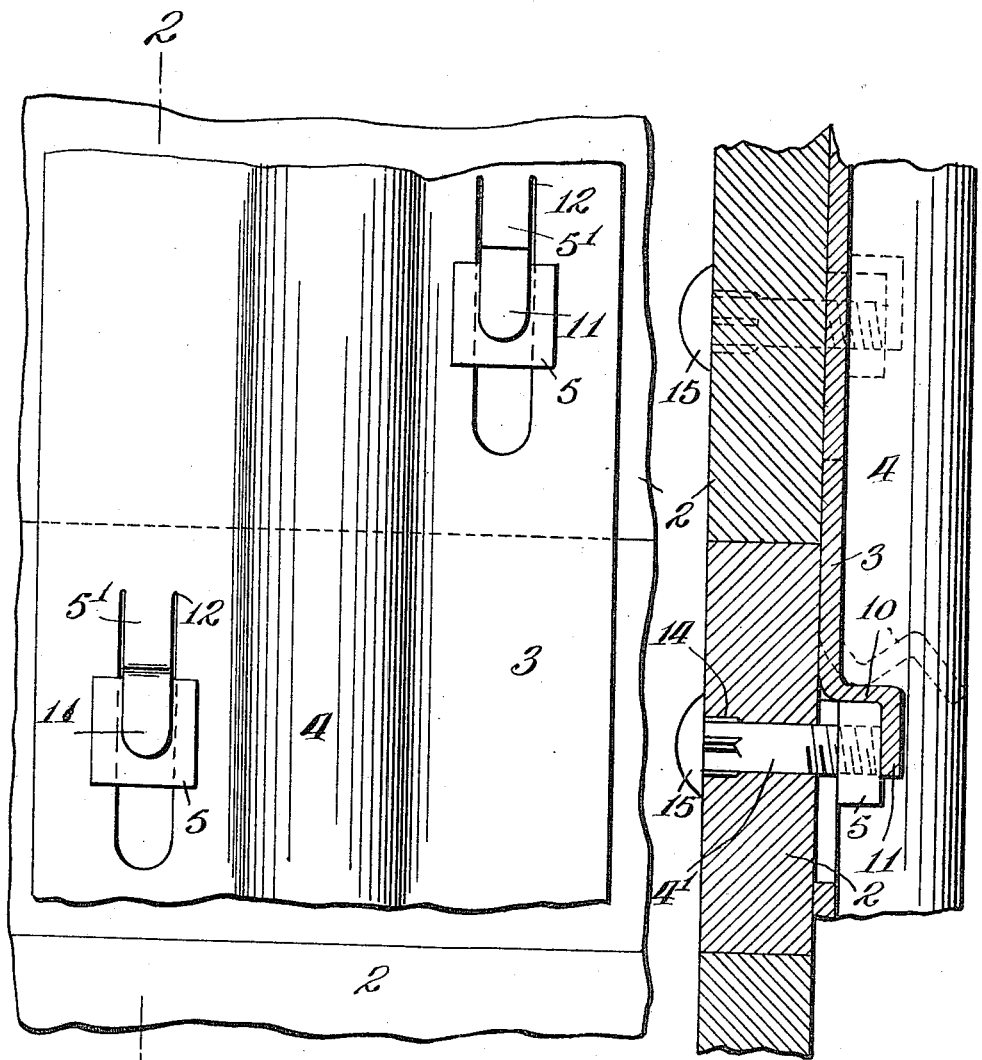

F. G. NEAL.
NUT LOCKING DEVICE.
APPLICATION FILED NOV. 15, 1912.

1,144,493.

Patented June 29, 1915.
2 SHEETS—SHEET 1.

WITNESSES

INVENTOR
FRANKLIN GREAR NEAL
BY ATTORNEY

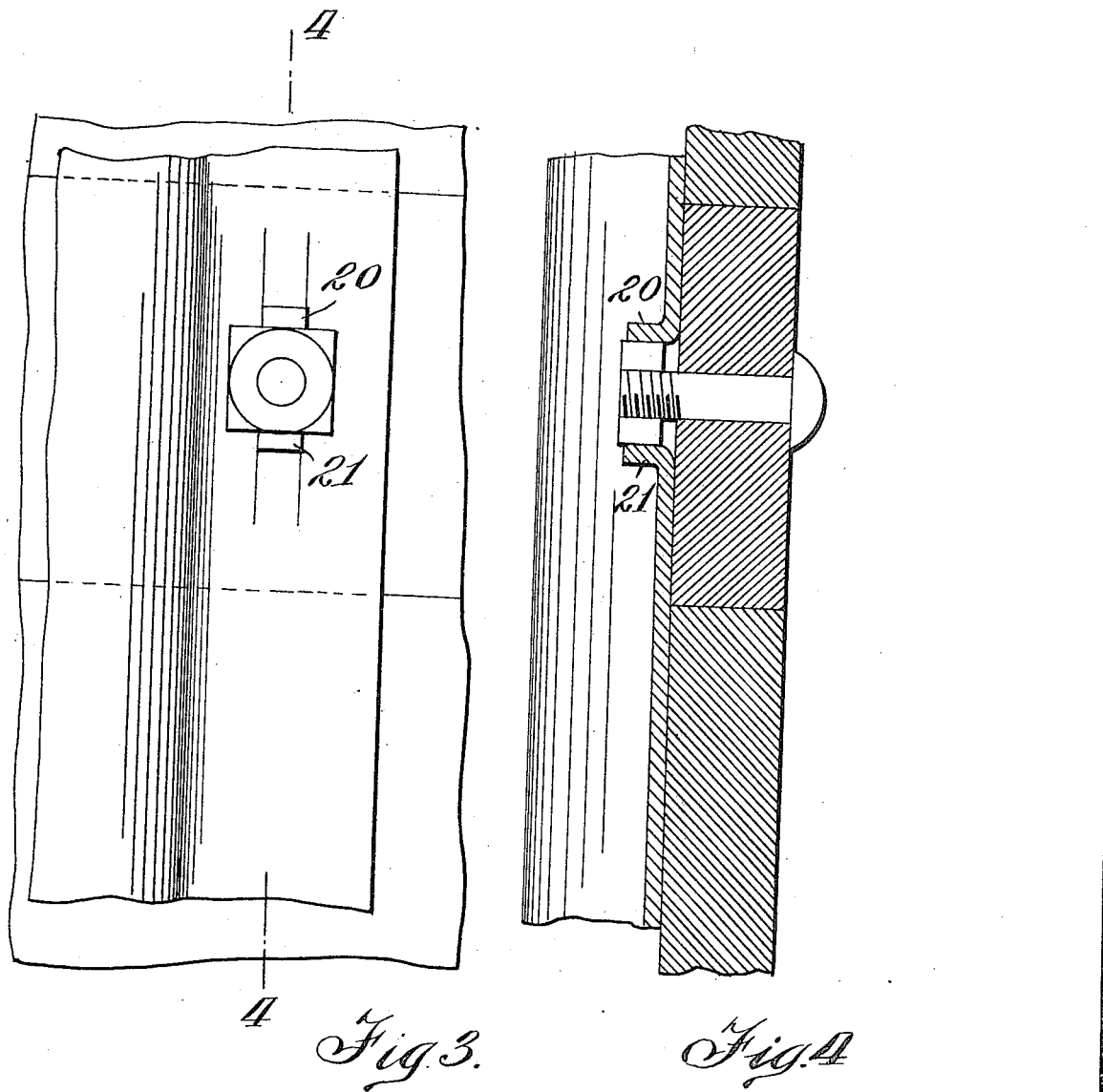

UNITED STATES PATENT OFFICE.

FRANKLIN GREAR NEAL, OF HALIFAX, NOVA SCOTIA, CANADA.

NUT-LOCKING DEVICE.

1,144,493. Specification of Letters Patent. Patented June 29, 1915.

Application filed November 15, 1912. Serial No. 731,595.

*To all whom it may concern:*

Be it known that I, FRANKLIN GREAR NEAL, residing at Halifax, in the Province of Nova Scotia, Canada, a citizen of the United States of America, have invented certain new and useful Improvements in Nut-Locking Devices; and I do hereby declare that the following is a full, clear, and exact description of the same.

This invention relates to nut locking devices and is particularly adapted for application to bolts and nuts used in wall structures to secure the wall members to the supporting posts, although it will be understood that it may be applied with advantage to other uses.

The invention has for an object to provide a more simple and less expensive form of nut lock than those heretofore known.

For further comprehension of the invention and of the objects and advantages thereof reference will be had to the following description and appended claims, and to the accompanying drawings forming part of this specification in which similar reference characters indicate the same parts and wherein;

Figure 1 is a face view of a portion of a wall having the invention applied thereto; and Fig. 2 is a transverse vertical section on the line 2—2 Fig. 1. Fig. 3 is a front elevation of a modification. Fig. 4 is a vertical section on the line 4—4 Fig. 3.

In the drawings I have shown my invention applied to a wall structure comprising wooden wall members supported by metal posts to which they are bolted, the invention being employed to lock the nuts upon the bolts. The wooden wall members are shown at 2 in the drawings and the metal supporting post at 3, the latter being made of sheet metal pressed outwardly to form a central reinforcing rib 4.

The bolts securing the members 2 to the post are shown at 4′ and have nuts 5 screwed on their ends. The manner of locking these nuts against unscrewing is as follows: Instead of punching out a circular disk of metal from the post to form an opening for the bolt an elongated slug or tongue 5′ of a width equal to the diameter of the bolt is pressed out from the metal, this slug remaining as shown attached to the post at one end, the bolt passing through the opening left by pressing out the tongue. This tongue, as shown in Fig. 2, is turned outwardly as at 10 to lie against one side of the nut while the end thereof may be flattened down as at 11 upon the face of the nut. As shown most clearly at 12 in Fig. 1 the length of the slug or tongue is sufficient to permit its being bent backwardly (as shown in dotted lines in Fig. 2) clear of the nut and allow the latter to be unscrewed. In this application of the invention the bolt is locked against turning by means of the squared neck 14 under the head 15 thereof which engages the wall member.

As will be readily seen my improved nut locking device enables the nut to be securely locked upon the bolt without the employment of any parts other than those it is desired to secure together by the bolt.

In Figs. 3 and 4 I have shown a modification in which a pair of tongues, 20 and 21 respectively, are struck out from the metal and engage opposite sides of the nut. It will be understood of course that my improved lock might also be applied to the bolt head.

What I claim is as follows:

1. In a nut locking device for car structures, the combination of a member, a bolt passed through the member and having one end protruding from one side thereof, a second member disposed with its inner surface flat against the first member, such second member having a tongue attached thereto at one end and pressed out therefrom to form an opening for the reception of the protruding end of the bolt, a nut spanning the opening in the second member and screwed upon the bolt against the outer surface of the second member, the inner surface of the tongue being disposed flat against one side of the nut for substantially the full depth of the latter.

2. In a nut locking device for car structures, the combination of a member, a bolt passed through the member and having one end protruding from one side thereof, a second member disposed with its inner surface flat against the first member, such second member having a tongue attached thereto at one end and pressed out therefrom to form an opening for the reception of the protruding end of the bolt, a nut spanning the opening in the second member and screwed upon the bolt against the outer surface of the second member, one portion of the inner surface of the tongue being disposed flat against one side of the nut and another portion extended over one corner of the nut and disposed flat against the face of the latter.

In testimony whereof, I have signed my name to this specification, in the presence of two subscribing witnesses.

FRANKLIN GREAR NEAL.

Witnesses:
MARY B. MORRISON,
MARY C. SHEEHAN.

Copies of this patent may be obtained for five cents each, by addressing the "Commissioner of Patents, Washington, D. C."